April 13, 1954

H. KAHLE 2,675,089

PROCESS AND AN APPARATUS FOR THE PURIFICATION OF GASES BY ADSORPTION

Filed Dec. 20, 1950

INVENTOR
HEINRICH KAHLE
By
ATTORNEY.

Patented Apr. 13, 1954

2,675,089

UNITED STATES PATENT OFFICE 2,675,089

PROCESS AND AN APPARATUS FOR THE PURIFICATION OF GASES BY ADSORPTION

Heinrich Kahle, Pullach, near Munich, Germany, assignor to Gesellschaft fuer Linde's Eismaschinen A.-G., Hoellriegelskreuth, near Munich, Germany Application December 20, 1950, Serial No. 201,738

Claims priority, application Germany January 5, 1950

2 Claims. (Cl. 183—4.7)

This invention relates to a process and to an apparatus for the purification of gases and gas mixtures and for the separation of adsorptive components from the same.

The following procedure is often applied to serve this purpose.

The crude or initial gases to be purified are conducted through adsorbers wherein the flow direction is periodically reversed. The adsorbed gas components are removed by regenerating and heating the adsorbers with auxiliary gases, vapors or with the crude gas. The thus expelled gas components are condensed or concentrated.

The main object of the invention is a simple method and apparatus for the purification and separation of gas mixtures by adsorption, whereby avoidance of heat and cold losses is particularly observed.

It is a further object of the invention to provide a simple apparatus, which will enable operation at low costs, does not require special types of regenerating gases and practically does not need attendance.

In fulfillment of these objects, the initial or crude gas itself is in a known manner used as a regenerating or adsorbate expelling gas. The components of the gases to be removed by adsorption in groups of reversal flow adsorbers are concentrated in the crude gas which is used for regenerating purposes. They are preferably recovered from the same by condensation at low temperature. The heated crude gas is conducted through the one branch of a reversible two-branch adsorber arrangement. Upon enrichment with adsorbate deposited in the adsorber during a previous loading step, the gas is cooled, the enriched concentrate is removed and the remaining gas is conducted in the cool state through the other branch of the adsorber arrangement, which had been regenerated in a previous cycle period of the adsorbate taken up in the preceding period. The adsorber or adsorber branches are operated in such a manner that they take up heat and cold and release the same practically without loss; consequently they are heated and cooled to such an extent only that an essential temperature gradient is maintained from one end to the other end of the adsorbent, the latter being a generally known principle in the refrigerating art of operating heat and cold storers.

In contradistinction to the customary condensation and revaporization of condensates in cold accumulators is the loading and deloading work of the adsorber branches in the present case incompletely performed. If the deloading would be completed, considerable heat losses would be inevitable.

An apparatus for carrying out this invention is by way of example illustrated in the attached drawing.

Figure 1:
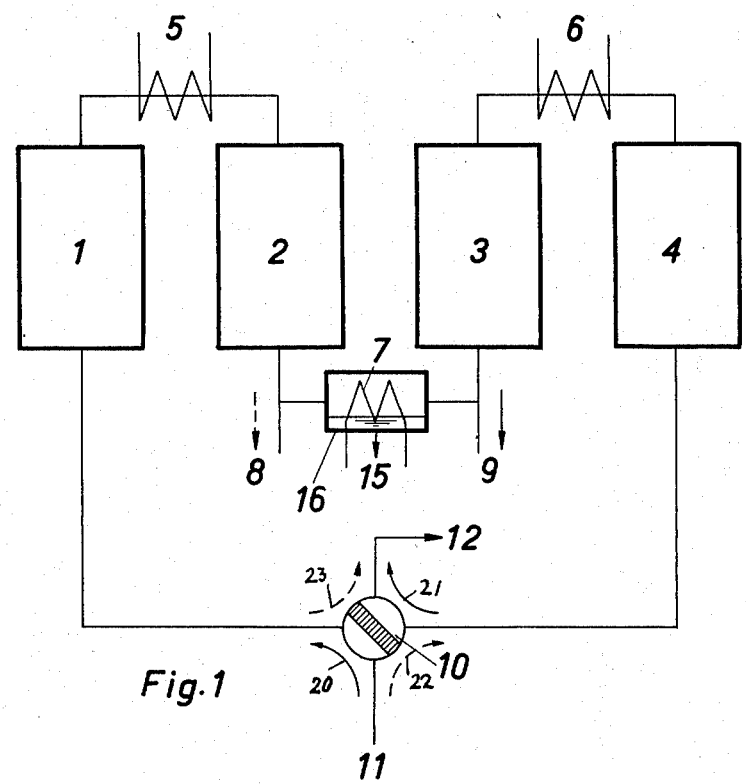
Fig. 1 is a schematic view of the apparatus.

The apparatus for use in connection with this invention comprises essentially two adjacently located adsorber groups or branches.

The branch shown on the left side of the drawing comprises an adsorber 2 which, in the customary manner, is charged with a layer of an adsorbent material, and a heat accumulator laterally coordinated to the adsorber 2.

The adsorber branch shown on the right side of the drawing comprises an equally built adsorber 3 and a laterally coordinated heat accumulator 4. The two adsorbers are located side by side and the heat accumulators are arranged at opposite sides of the adsorbers.

A valve 10 for the reversal of the gas flow is provided in a central location relative to the two adsorber branches.

The gas enters through conduit 11 into valve 10. In accordance with the position of the valve shown in the drawing, the gas flows in the direction of arrow 20 into the one end of heat accumulator 1, leaves the same at the opposite end, passes through heater 5, enters the adsorber 2 at its one end, leaves the adsorber at the opposite end, passes through cooler 7 located between the two adsorbers, enters the second adsorber 3 at the one end, leaves the same at the opposite end, passes through heater 6, enters the heat accumulator 4 at its one end, leaves the same at the opposite end, passes through valve 10 in the direction of arrow 21 and is discharged through conduit 12.

By rotation of valve 10 through 90°, the gas flow is reversed; the gas now flows from conduit 11 through valve 10 in the direction of dotted arrow 22, whereby heat accumulator 4, heater 6, adsorber 3, cooler 7, adsorber 2, heater 5, heat accumulator 1 are passed and the gas is discharged in the direction of dotted arrow 23 through valve 10 and conduit 12.

Gas concentrates and condensates 16 formed in the adsorbers or in cooler 7, Fig. 1, may be removed at places 8, 15, 9; however, if required, further concentrate or condensate removers may be provided at suitable places of the adsorbent layers.

The individual parts of this apparatus may also be superposed upon each other and located in a tube; in this case, special condensate and concentrate removers will have to be provided. Only the operation of the adsorber branches at a temperature gradient enables the selective separation of the individual components of the adsorbate at predetermined parts of the adsorbent layer.

Figure 2:
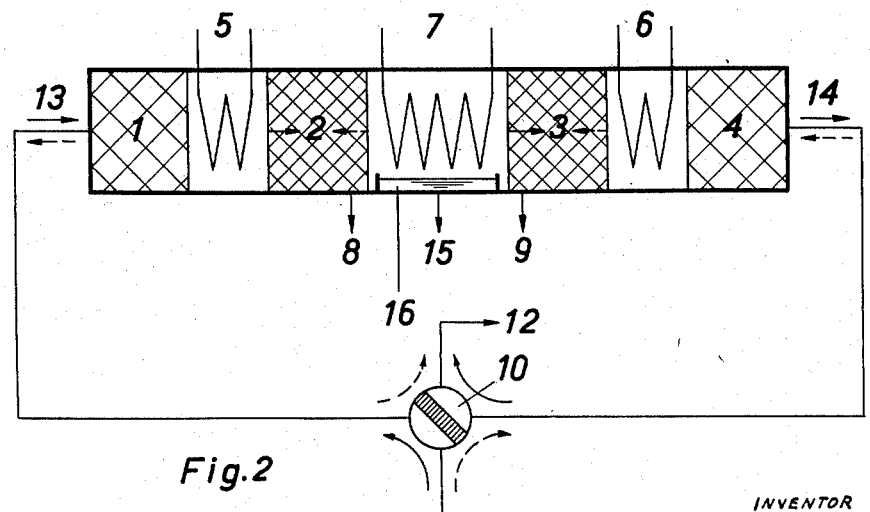
Fig. 2 is a projection thereof in horizontal.

Fig. 2 shows a horizontal projection of the device illustrated by Fig. 1. Identical numerals indicate identical parts. The only difference from Fig. 1 consists in that the discharge of the concentrate or condensates is effected at the place of their formation or maximum concentration as, for instance at 8, 9. The accumulators 1, 4 and the adsorbers 2, 3 are here shown to have a smaller size and a longer longitudinal axis compared with their diameter. The heaters 5, 6 and the cooler 7 are located within the apparatus, which for instance may have the shape of a single tube. The continuous operation of the apparatus is hereby facilitated. However, each accumulator and adsorber, respectively, as well as the heaters and the cooler may be constructed as separate units and a vertical superposition of the parts may be adopted, in the manner of Fig. 2.

As apparent from the drawing, the apparatus used for the purposes of this invention essentially consists of two periodically reversible adsorbers 2, 3 which contain in the usual manner, adsorbent layers. The adsorbers exert different functions after each reversal. A cooler 7 is interposed between the two adsorbers; heaters 5, 6 are positioned between the heat accumulators 1, 4 and the adsorbers 2, 3. The heaters 5, 6 are located at the outer end of the adsorbers 2, 3, or between the same and the heat accumulators 1, 4. A flow reversal valve 10 is provided to cause a periodical change of the gas flow through the apparatus in opposite directions. Condensate or gas concentrate discharge means 8, 9, 15 are provided alongside of the adsorbent layers and the cooler.

The operational advantages and characteristics of this invention will now be described more in detail.

In conformity with the greater or lesser adsorptive character of the gas components to be separated, the crude gas may be more or less preheated and the enriched gas, to a $$\frac{2}{greater} \text{ or } \frac{1}{lesser} \text{ degree}$$

may be cooled during its passage between the two adsorbent layers.

If the gas mixture under treatment contains a large portion of easily adsorptive components, such as benzol or alcohol, moderate cooling, for instance by an ammonia refrigerator, will be sufficient. The preheating of the cooled raw gas is helpful, as in this manner a small quantity of the adsorbate only will remain in the hot entrance portion of the adsorber and upon reversal of the gas flow will be taken along by the residual gases at a small rate and during the first period of the reversal. If low boiling or low concentrated gas components are to be enriched, intense cooling must be provided between the adsorbers or adsorbent layers. However, in this case, the initial gas needs only a slight preheating or no preheating at all. The loading as well as the deloading of the adsorbent is not brought to completion.

In conformity with the invention the step of deloading the one adsorber by crude gas is combined with the immediate loading of the second adsorber with crude gas from the first adsorber.

Upon completion of a series of flow reversals a portion of the expelled components may be separated and removed as condensate between the two adsorber branches.

The separation of condensate after a series of flow reversals may be replaced by the removal of a portion of the crude gas, which is enriched with desorbate, and by its entry into a further enriching device.

For the recovery of the heat, which is inherent in the gas, a heat accumulator may be provided at the entrance side of the crude gas into the adsorber and at the exit side of the residue gas of the other adsorber. Heat losses will be greatly reduced in this manner. Heating and cooling may, under these conditions, be performed continuously.

In conformity with a further embodiment of the invention, the applied quantities of cold may be utilized in a very economical manner and losses of cold may be avoided, if the adsorbent materials are simultaneously used for the gas enrichment and the accumulation of heat and cold respectively. In this case, the adsorbers are operated with a temperature gradient, whereby the adsorber, which has been regenerated with hot crude gas as well as the adsorber, which has been treated with cooled crude gas, are incompletely heated and respectively cooled. Accordingly, there will be a substantial temperature gradient in the two adsorbers.

It is essential that at the end of the regenerating step, that is shortly before the reversal of the gas flow, a temperature difference is maintained between the end portion of the adsorbent layer and the cooler, which upon reversal of the gas flow, will guarantee a sufficient cold content in the deep-cooled enriched crude gas to secure the adsorption of its inherent enriched components as well as the adsorption of those gas components which have remained in the gas after condensation.

In this direction it must be kept in mind that the cold supply is to be so controlled as to effect a sufficient cooling of the adsorbent and to make up for the adsorption heat of the gas components to be adsorbed.

If the quantity of the gas to be adsorbed is increased, the temperature difference between the cooling medium and adsorber must be increased accordingly. On the other hand, the temperature level of the cooler must be so adjusted, that the adsorptive capacity of the adsorbent is sufficiently large to take up the total quantity of the enriched components still present in the gas.

The adsorbent layers may be disposed in vertical adsorbers, which are passed by the preheated or the deep-cooled crude gas, respectively.

Under certain circumstances, a transitory condensation of the expelled gas components may take place in the adsorbers. This may be particularly so at a higher concentration of the adsorbate and in the still cold rear portion of the adsorbent layers. At the same time, a mixture of the condensates will take place and a certain quantity of the same will be taken up by the adsorbent, if the condensate is forced to travel downwards through long adsorbent layers. In order to avoid this calamity the condensate, which accrues, is collected at the place of its formation and is discharged. This may be effected by means of deflector or collector plates or pockets or by a horizontal or inclined disposition of the adsorbent layers. The accrued condensates may be collected in the vicinity of the place of their formation, for instance at the underside of inclined containers, and discharged. In order to speed-up and facilitate the outflow of the condensates, the adsorbent may be interrupted at suitable and particularly at those places where the condensates are formed, and a short layer of accumulating material having a smooth surface may be provided at these places. These layers will not only absorb a small quantity of condensate but quickly dispense the same and prevent, prior to the evaporation of the condensate, the gases acting on these condensates, since it must be considered that the gases during the regenerative step become increasingly heated at these places.

Instead of removing the condensates from the cooler 7, enriched gas may be discharged from the adsorbers. This should be preferably effected at the place of their maximum enrichment with an expelled gas component. This procedure is particularly recommended, if enriched gas components are treated having small initial contents of adsorbable components and also in those cases where the condensation of such components on the adsorbent is to be prevented.

The quantity of the carrier gas simultaneously removed with the accumulated gas component is only a small fraction of the total gas quantity under treatment. The accumulation of the adsorbable components will be higher if small amounts are withdrawn and it will be smaller in the case of larger gas withdrawals.

If the accumulation is so controlled that the removed concentrate represents an essential portion of the treated gas mixture, it is necessary to utilize the cold content of the concentrates or condensates in an economical manner. This may be attained by heat exchange with gases to be cooled.

As mentioned before, the accumulation of the adsorptive components may be intensified to such an extent that condensates are formed in the cooler 7 or already in the sluiced adsorbent layers. These condensates may be collected or discharged at the place of their formation.

Since certain changes in carrying out the above invention could be made without departing from the scope thereof, it is intended that all matter contained in the above description or shown in the accompanying drawing shall be interpreted as illustrative and not in a limiting sense.

Having thus described the invention, what I claim as new and desire to be secured by Letters Patent, is as follows:

1. An apparatus for separating condensable components from gaseous mixtures and comprising a pair of adsorbers, a cooling chamber having opposite ends in flow communication with one end respectively of each of said adsorbers, said cooling chamber including means for discharging condensates therefrom, a pair of heating chambers each having one end in flow communication with the other end of a respective one of said adsorbers, a pair of heat accumulator means for receiving heat energy from gases flowing therethrough at a temperature greater than that of said heat accumulator means and for storing said heat energy and for transferring said stored heat energy to gases flowing therethrough at a temperature less than that of said heat accumulator means, one end of each of said heat accumulator means being in flow communication with the other end of a respective one of said heating chambers, an inlet conduit, an outlet conduit and valve means selectively operable to connect the inlet conduit to the other end of one of said heat accumulator means, and the outlet conduit to the other end of the other of said heat accumulator means or, alternatively, to connect the inlet conduit to the other end of said other heat accumulator means and the outlet conduit to the other end of said one heat accumulator means.

2. A method of removal of condensable components from gaseous mixtures and comprising the steps of heating a first quantity of gaseous mixture, passing the heated mixture through a first adsorber to regenerate the latter, cooling the mixture to condense and separate therefrom a portion of the condensable components thereof, then passing the mixture through a second adsorber to have adsorbed therein another portion of the condensable components of the mixture, then heating the mixture, thereupon withdrawing heat energy from the mixture, storing said withdrawn heat energy and then transferring the latter to a second quantity of gaseous mixture, then adding additional heat energy to said second quantity of mixture, then passing the latter through said second adsorber to regenerate said second adsorber after said first quantity of mixture has passed therethrough, then cooling said second quantity of mixture to condense and separate therefrom a portion of the condensable components thereof, then passing said second quantity of mixture through said first adsorber to have adsorbed therein another portion of the condensable components of said second quantity, then heating the latter, then withdrawing heat energy from said second quantity, storing the last-recited heat energy and then transferring the latter heat energy to a next succeeding quantity of gaseous mixture, the above-recited steps being repeated with successive quantities of mixture with the heat energy withdrawn from each quantity being transferred to the next succeeding quantity of gaseous mixture, all of said quantities being substantially of the same gaseous composition.

References Cited in the file of this patent

UNITED STATES PATENTS

| Number | Name | Date |
| --- | --- | --- |
| 913,325 | Touzimsky | Feb. 23, 1909 |
| 1,948,779 | Abbott et al. | Feb. 27, 1934 |
| 1,959,389 | Shoosmith | May 22, 1934 |
| 2,083,732 | Moore et al. | June 15, 1937 |